US008189620B2

(12) United States Patent
Duval et al.

(10) Patent No.: US 8,189,620 B2
(45) Date of Patent: May 29, 2012

(54) COMMUNICATION SYSTEM WITH CROSS-COMPATIBILITY AND ASSOCIATED COMMUNICATION FRAME

(75) Inventors: Jerome Duval, Marignier (FR); Serge Neuman, Seynod (FR); Michel Fournet, Cuvat (FR)

(73) Assignee: Somfy SAS, Cluses (FR)

( * ) Notice: Subject to any disclaimer, the term of this patent is extended or adjusted under 35 U.S.C. 154(b) by 1758 days.

(21) Appl. No.: 11/353,605

(22) Filed: Feb. 14, 2006

(65) Prior Publication Data

US 2006/0193293 A1 Aug. 31, 2006

(30) Foreign Application Priority Data

Feb. 25, 2005 (FR) ..................................... 05 01943

(51) Int. Cl.
*H04J 3/00* (2006.01)

(52) U.S. Cl. ....................................... 370/476; 370/509

(58) Field of Classification Search .................. 370/321, 370/331, 347, 352, 466–476, 50, 9
See application file for complete search history.

(56) References Cited

U.S. PATENT DOCUMENTS

| | | | | |
|---|---|---|---|---|
| 6,341,145 | B1 * | 1/2002 | Hioe et al. | 375/256 |
| 6,970,434 | B1 * | 11/2005 | Mahany et al. | 370/256 |
| 7,123,617 | B1 * | 10/2006 | Abrol | 370/394 |
| 7,340,251 | B1 * | 3/2008 | McClure | 455/434 |
| 7,350,077 | B2 * | 3/2008 | Meier et al. | 713/171 |
| 2002/0018479 | A1 * | 2/2002 | Kikkawa et al. | 370/401 |
| 2002/0136224 | A1 * | 9/2002 | Motley | 370/477 |
| 2004/0217743 | A1 * | 11/2004 | Brown et al. | 323/247 |
| 2004/0235489 | A1 * | 11/2004 | Kwon | 455/452.2 |
| 2005/0135318 | A1 * | 6/2005 | Walton et al. | 370/338 |
| 2005/0237965 | A1 * | 10/2005 | Kuperschmidt et al. | 370/321 |
| 2005/0249183 | A1 * | 11/2005 | Danon et al. | 370/473 |
| 2006/0126847 | A1 * | 6/2006 | Ho | 380/277 |
| 2006/0193293 | A1 * | 8/2006 | Duval et al. | 370/331 |

FOREIGN PATENT DOCUMENTS

| | | |
|---|---|---|
| JP | 11074869 A * | 3/1999 |
| WO | WO 92/01979 | 2/1992 |
| WO | WO 98/34208 | 8/1998 |
| WO | WO 01/31873 A2 | 5/2001 |

* cited by examiner

*Primary Examiner* — Ricky Ngo
*Assistant Examiner* — Phuongchau B Nguyen
(74) *Attorney, Agent, or Firm* — Husch Blackwell LLP

(57) ABSTRACT

A telecommunications frame used for remote control in home automation systems provides for protocol extension while retaining the organization and the content of the data of an old frame used in earlier generation remote control transmitters/receivers while adding additional information able to be exploited by later-generation receivers. The frame comprises a first part comprising first data and a first control field and a second part comprising second data and a second control field. A relay bit commences the second part of data, the relay bit having a predetermined value. Such a frame can be used to ensure cross-compatibility in a system comprising older generation and newer generation command transmitters and older generation and newer generation command receivers.

24 Claims, 3 Drawing Sheets

| Byte 1 8 bits | Byte 2 8 bits | | Byte 3 8 bits | Byte 4 8 bits | Byte 5 8 bits | Byte 6 8 bits | Byte 7 8 bits |
|---|---|---|---|---|---|---|---|
| RANDOM | CKSTR | | CPTH | CPTL | ADDR3 | ADDR2 | ADDR1 |
| | CONTROL 4 bits | CKS 4bits | | | | | |
| | | Checksum field | | | Address field | | |

PRIOR ART

| Random | CKSTR | | CPTH | CPTL | ADDR3 | ADDR2 | ADDR1 | Relay bit | Other usable bits |
|---|---|---|---|---|---|---|---|---|---|
| 8 bits | Cde 4 bits | CKS1 4 bits | 8 bits | 8 bits | 8 bits | 8 bits | 8 bits | 1 bit | 23 bits including CKS2 (4 bits) |

Base frame (excluding soft sync.) | Additional info.

New generation frame (excluding soft sync.)

COMMUNICATION SYSTEM WITH CROSS-COMPATIBILITY AND ASSOCIATED COMMUNICATION FRAME

FIELD OF THE INVENTION

The invention relates to a communication system allowing cross-compatibility between products of an older generation and products of a newer generation. The present invention relates to the field of remote control of actuators and in particular to the wireless control of actuators used in a home automation or control system providing home comfort and security, for example for the lighting, the operation of the locks, window blinds, the ventilation and air conditioning systems, etc.

BACKGROUND

Herein, cross-compatibility means upward and downward compatibility. Upward compatibility is realized when new receivers accept and understand data transmitted according to an old protocol by old transmitters; and downward compatibility is realized when old receivers accept and understand data transmitted according to a new protocol by new transmitters.

Home control systems conventionally comprise actuators with associated sensors forming receivers of commands controlled by control units or control points forming command transmitters. In the following, “transmitter” refers to a device which is able to transmit control data and “receiver” to a device which is able to receive and interpret control data. The receivers are linked to actuators, for example electromechanical actuators, in order to transform the command received into an action on an element of the home control system. The transmission of data between the transmitter and the receiver conventionally occurs via a radio frequency link, although other transmission media are possible, such as for example an infrared link.

The transmitters and receivers can be mobile or fixed and comprise an autonomous power supply, for example from batteries. A fixed receiver can itself be powered by batteries or by means of photovoltaic cells for example, if it is linked to an autonomous actuator, which avoids wiring; and the reception function can be activated by a control or intermittently in order to limit power consumption.

The data transmitted between a transmitter and a receiver contain information relating to the nature of the control, the identification of the receiver and of the transmitter and other information such as data relating to the encryption, the history of the controls transmitted and the verification of the integrity of the transmitted data. The transmitted data are organized in a predetermined manner by a protocol. By protocol is understood a set of specifications describing conventions and rules to be followed in a data exchange. The protocols serve to guarantee efficiency in the data exchanges.

Certain existing protocols use fixed-length frames and all of the bits of the frame are exploited. This is the case for the RTS protocol (Radio Technology Somfy®) used in the home control systems installed by the applicant.

In such a situation, in order to allow a development of the functionalities for new products, it is common to construct a new protocol in which all of the existing or recently studied functionalities are taken into account and which provides bytes available for future developments. The drawback of a new protocol is generally its non-compatibility with the already installed products, not to mention the development costs generated.

Document WO 92/01979 discloses an extension of a wireless communication protocol to change from fixed codes to rolling codes, which equates to an increase in the number of possible addresses for the protocol.

The old frames comprise messages of ten word of 4 bits each. Two consecutive frames are separated by pauses (blank spaces) of 39 bits. Each start of the frame is signalled by a synchronization bit. In the case of a radiocommunication between a transmitter and a receiver, the frame is repeated a certain number of times, as long as the pressure on the transmitter button which is the origin of this transmission is maintained. The frame transmission durations are in fact generally much shorter than the duration of a manual pressing of the button. The receiver recognizes the transmitted format by detecting a synchronization bit following a blank space and it records the 10 word message sent.

The new frames comprise signals of twenty words, divided into two messages of ten words. Each message of ten words is transmitted in the traditional manner, i.e. as an old frame with blank spaces separating the two messages. The synchronization bit of the second message is however modified in comparison with the first. Each part of the message is recorded successively by the receiver. The synchronization bit of the second message serves to identify whether it is a second part of the message, and therefore a new generation frame, or another old generation message (repetition of the frame or frame with a different content).

Document WO 01/31873 discloses an extension of a protocol for frames of fixed length and with a predetermined content. This patent application describes the state of the art mentioning that the known protocol extensions allowing a downward compatibility consist of providing an explicit mechanism indicating an extension of the frames, for example by an indication of the frame length, an encoding of the indicator or reserved data. These known methods cannot be applied systematically and in particular cannot be applied in the case of a protocol with fixed-length frames, in which all the bits are used or reserved. According to the solution presented in this document, the field extensions are not attached to existing fields of the protocol, but placed elsewhere in the message.

Document WO 98/34208 describes a system for managing the compatibility between an old generation of products using an infrared transmission and a new generation of products using a radio frequency transmission. Downward compatibility is defined as the case where the old generation products only consider part of the transmitted data for their functioning but all of the data for the calculation of a sum for the purposes of verification, known as a “checksum”. The new generation protocol must maintain the checksum as the last data transmitted in order to retain this compatibility. The upward compatibility is provided by the control of the number of items of data transmitted and the determination of the corresponding type of protocol by the new generation receivers. In this system, the data inside the frame are reorganized and do not follow after an old frame.

The protocol extensions described in the above-mentioned documents WO 01/31873 and WO 98/34208 require adaptations of the frames of the existing protocol.

Moreover, the protocol extension described in the above-mentioned document WO 92/01979 can interfere with the reception of a message by old generation receivers. The complementary information is not integrated into the same frame and the flow of transmission (cyclic repetition of the frames and the inter-frame intervals) of messages which can be read by the old generation receivers is not the same depending on whether it is a transmission from an old or new generation transmitter.

SUMMARY

A need therefore exists for a protocol extension which allows the organization and the content of the data of an old frame to be maintained whilst adding additional information, with everything being transmitted in the same frame.

For this purpose, in the invention additional information is added after a conventional frame of an existing protocol transmitting this information in the inter-frame interval usually provided in the protocol.

The invention thus provides a control frame comprising:

a first part comprising first data and a first control field;

a second part comprising second data and a second control field;

a relay bit commencing the second part, said relay bit having a predetermined value.

According to the invention, a frame for a new generation protocol is created. Such a frame comprises a first part comprising data corresponding to a conventional frame of an existing protocol and a second part comprising additional data and commencing with a relay bit fixed at a predetermined value. The relay bit and the second part of the frame are transmitted during the interval of time corresponding to the inter-frame silence of the existing protocol.

According to the embodiments, the control frame according to the invention comprises one or more of the following characteristics:

the second part of the frame follows directly after the first part of the frame;

the first control field belongs to the first part of the frame;

the second control field belongs to the second part of the frame or is global for the whole of the frame;

the relay bit is fixed at '1';

the second data of the second part of the frame are encrypted with a first encryption key transmitted in the first part of the frame;

the second data of the second part of the frame are encrypted with a second encryption key transmitted in the second part of the frame;

The invention also provides a system for control of actuators comprising:

an old generation command transmitter which is able to transmit a control frame in a cyclic manner according to a first protocol;

a new generation command transmitter which is able to transmit a control frame in a cyclic manner according to a second protocol, said frame of the second protocol comprising a first part constituted by a frame of the first protocol directly followed by a second part comprising additional information;

an old generation command receiver linked to an actuator and able to receive and interpret a control frame according to the first and second protocols;

a new generation command receiver linked to an actuator and able to receive and interpret a control frame according to the first and second protocols.

According to the embodiments, a system for control of actuators according to the invention comprises one or more of the following characteristics:

the control frame of the second protocol is a frame according to the invention;

the frame of the first protocol has a fixed length;

the first protocol transmits frames separated by inter-frame silences and the additional information of the frames of the second protocol is transmitted during the inter-frame silences of the first protocol;

the additional information of the frames of the second protocol is only interpreted by the new generation command receivers, the old generation command receivers interpreting only the frame of the first protocol contained in the frame of the second protocol;

a frame of the second protocol is transmitted at a first data rate when the frame of the first protocol is transmitted and at a second data rate when the additional information is transmitted, the second data rate being greater than the first;

the additional information of a frame of the second protocol is interpreted in combination with the data of the frame of the first protocol contained in the frame of the second protocol;

the cycles of transmission of the control frames of the first protocol and of the second protocol are identical;

at least one portion of the frame of the second protocol is encrypted;

the encrypted portion is the frame of the first protocol contained in the frame of the second protocol;

The invention also relates to a command transmitter for a telecommunications system which is able to transmit control frames according to the invention.

The invention also relates to a command receiver for a telecommunications system which is able to receive control frames according to the invention.

According to one characteristic, the receiver is able to interpret the content of the second part of data.

According to one characteristic, the receiver interprets the content of the second part of data as a function of the content of the first part of data.

According to another characteristic, the receiver is able to interpret the content of the first part of data and to interpret the second part of data as noise.

BRIEF DESCRIPTION OF THE DRAWINGS

Other characteristics and advantages of the invention will become apparent when reading the following detailed description of embodiments of the invention, given by way of example only and with reference to the drawings which show.

DETAILED DESCRIPTION

In the remainder of the description, the invention is described in an example of application in a home automation or control system. Hereafter the words "command transmitters" and "command receivers" are used to designate objects whose function is to transmit or receive the commands given by a user. A command transmitter is also commonly called a control unit, while a command receiver is a sensor controlling an actuator of an openable member or of a window blind.

The invention is aimed at an existing protocol extension. The following description refers to the existing RTS (Radio Technology Somfy™) protocol used in the transmission between command transmitters and command receivers marketed by the applicant, used for example for Altus RTS, Oximo RTS, Axovia and Axorn motors and Telis, Inis RTS, Centralis RTS, Chronis RTS or Keytis controls.

The RTS protocol is a proven and popular protocol in the world of home automation systems. It is associated with ergonomics known by the installers and its transmission qualities are reliable, in particular in terms of power and acceptance of the frames by the command receivers.

Figures 1, 2:
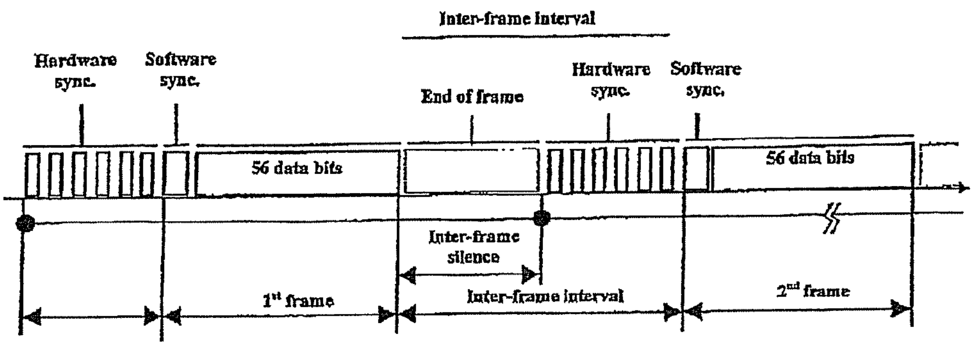
PRIOR ART Fig. 2
FIG. 1, a representation of a known RTS transmission protocol.
FIG. 2, the organization of the data of a frame of the RTS protocol of FIG. 1.

FIG. 1 illustrates a conventional RTS frame transmission. Such a frame, hereafter called a base frame, is introduced by a certain number of electronic synchronization pulses (called "hardware") and commences with a software synchronization pulse (called "software"). The RTS frames are repeated in a cycle and separated from each other by inter-frame silences, during which no signal is transmitted. During a control transmitted by a command transmitter according to the RTS protocol, the control frames are repeated several times cyclically in order to guarantee that at least one of the frames is correctly received by the receiver and/or to verify that certain controls are not continued for too long. For example, when a user presses a transmitter remote control button, the reaction time of the transmitter brings about the transmission of several complete frames corresponding to that pressing of the button. A time lapse (called a "time-out"), for example of 10 seconds, is provided, in order to stop the transmission, for example in the case of a prolonged pressure on the remote control button.

The unit comprising the inter-frame silence and the hardware synchronization bits is called an inter-frame interval. It is understood that the receiver does not perceive silence but noise during this interval, as opposed to interpretable data. These non-encoded intervals of silence allow the electronics of the receiver to fully retrieve each start and end of the frame and to have the time to fully process the data received, such as for example to carry out the unscrambling and the calculation of the checksum.

The time between the start of two consecutive frames is constant for a given protocol. However the inter-frame silence time is not crucial for a correct transmission of the frame and it can vary slightly without it having an influence on a correct reception of the data. The inter-frame interval in particular makes it possible to maintain a safety margin for the processing of the data in the frame transmitted previously and also serves to clearly mark the transmission rate of the various frames repeated cyclically. The frame rate is defined by a rate of transmission of sets each constituted by a frame and an inter-frame interval.

The transmission time for a complete frame according to the RTS protocol is of the order of 140 ms, including the hardware synchronization, the software synchronization, the data frame itself and the silence at the end of the frame. The duration of the silence between the end of the data frame and a new hardware synchronization is of the order of 34 ms.

FIG. 2 illustrates the organization of the data in a conventional RTS frame. An RTS frame contains 56 bits distributed as follows.

The first byte contains an encryption key constituted by a random number. The second byte contains 4 bits identifying the nature of the control (opening or closing of a door for example) and 4 bits of a verification sum, corresponding to a checksum. The third and fourth bytes are rolling code bits, modified according to a predetermined algorithm each time the transmitter remote control is pressed in order to constitute a safeguard against piracy. The following bytes comprise address bits identifying the transmitter.

The 24 address bits allow matches to be made between transmitters and receivers. The sharing of a common identifier allows the receiver to recognize the controls coming from a command transmitter, in order to respond to them. All information relating to the control of a particular command receiver by a particular command transmitter can be assimilated into the list of the identifiers. It may therefore be an encryption key belonging to this pair of elements or any confidential data useful for the transmission and/or the execution of a command.

It is seen in FIG. 2 that all the bits of the conventional RTS frame are used and a frame modification would produce a transmission incompatibility with the old products. The RTS frame is entirely made up of exploited data; new developments or functionalities can no longer be implemented using the conventional frame. In particular, the number of addresses available can no longer be increased, the encryption and the checksum are limited.

Moreover, the conventional RTS protocol is not optimal for an application with autonomous or stand-alone receivers. Autonomous products are not connected to the electrical power mains and therefore have limited energy resources. Autonomous receivers generally operate as follows: the electronics of the receiver is set to standby mode for the purpose of saving power. The receiver becomes active regularly, listens to see if it is receiving a signal and if not it returns to standby mode. In order to be suitable for communication according to a protocol of the RTS type or equivalent, a time for the receiver to become active which is at least equivalent to the inter-frame silence time must be provided. This inter-frame silence is relatively long in the case of the RTS protocol, which is not compatible with the power consumption standards or lifetimes required for the autonomous products.

According to the invention, a frame for a new generation protocol is created. Such a frame comprises a first part constituted by an RTS base frame comprising first data and a first control field, such as a first checksum, and a second part comprising second data and a second control field, such as a second checksum. The second part of a new generation frame starts with a relay bit fixed at a predetermined value.

Figures 3, 4:
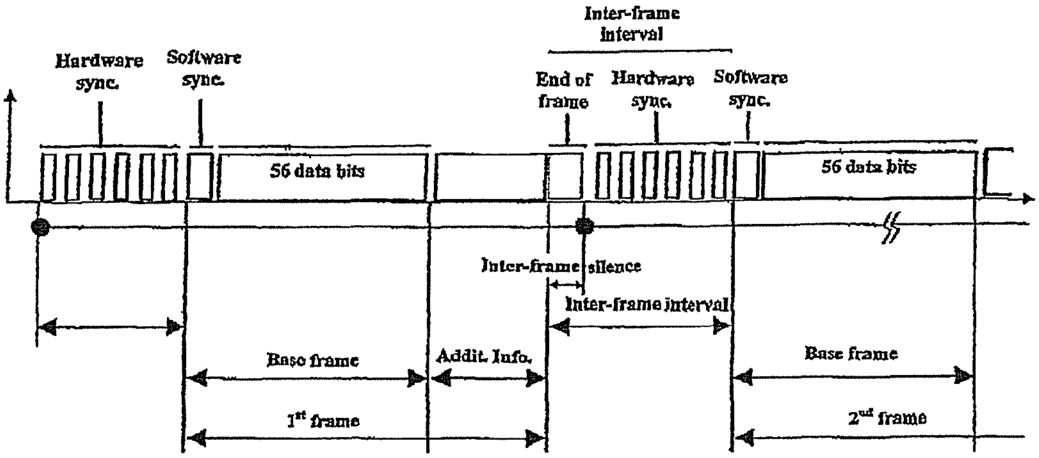
FIG. 3, a representation of a transmission protocol according to the present invention.
FIG. 4, the organization of the data of a frame of the protocol of FIG. 3 according to the invention.

FIG. 3 illustrates a frame transmission according to a new generation protocol, for example transmitted by a new generation transmitter. It is noted, by comparison with FIG. 1, that part of the inter-frame silence is replaced by a quantity of information which can be interpreted by new generation receivers. In particular, additional data are simply attached to a base frame. The second part of the frame therefore directly follows the first part of data constituted by a conventional RTS frame.

This additional data can thus be used to manage new functionalities of the products.

The duration of the inter-frame interval of the new generation protocol is thus reduced in relation to the duration of the inter-frame interval of the old generation protocol, and in particular the duration of the inter-frame silence. However the time lag between each start of frame during a cyclic transmission of the frames is constant and identical to that of the old generation. The flow of the frames is therefore maintained between the new generation protocol and the old generation protocol. Thus the functionalities based on the frame flow can be maintained as in the new protocol, for example the number of repeated frames for a control or the time-out in the case of a prolonged control.

The new generation protocol is also particularly suited to autonomous products as the duration of the inter-frame silence is reduced by the transmission of the second part of data: the time required for the receiver to become active is therefore greatly reduced.

FIG. 4 shows the organization of the data in a new generation RTS frame. It is seen that the frame of the new generation protocol contains a first part constituted by an RTS base frame of 56 bits to which a second part constituted by 24 bits of additional information is added; in particular a relay bit and 23 other bits which can be used for the transmission of data complementary to the data of the base frame. In the context of the invention, the second part of frame transmitted is preferably linked to the first part, i.e. the second data will make it possible to better define the information of the first data transmitted in the RTS base frame. For example, the additional information completes or parameterizes the RTS base frame by adding new functionalities and new parameters, whilst tightening the security of the transmission, etc. The additional information does not necessarily have an intrinsic value, i.e. it may be of no purpose is it is taken independently of the RTS base frame. In this case, if the information of the data of the first part of frame is encrypted for security reasons, it will not be necessary to encrypt the information of the second additional data of the second part of the frame, which in itself does not have a particular control function. If the second data of the second part of the frame had to be encrypted however, the same encryption key as that used for the first data of the RTS base frame could be used, or another encryption key, transmitted with the second data in the second part of the frame.

The number of bytes of the second part of the frame, corresponding to the amount of additional information transmitted, will be chosen as a function of the available inter-frame silence time, possibly providing a safety margin for the processing of information by the electronics of the receiver. The transmission of the second part of the frame could possibly extend over part of the hardware synchronization in addition to the inter-frame silence. In the case of the RTS protocol, the number of synchronization pulses provided is comprised between 6 and 12, of which 6 pulses are mandatory. In certain cases of application of the protocol, the inter-frame silence can be used for the transmission of optional synchronization pulses. These pulses can then be replaced by the additional data.

The frame according to the invention, for a new generation RTS protocol, therefore contains a first part constituted by the RTS base frame and a second part comprising additional information. The frame according to the invention also comprises two distinct control fields, called checksums. A first control field, belonging to the RTS base frame, is placed in the first part of the frame, for example in the second byte (CKS1), and a second control field (CKS2) is placed in the second part of the frame. The second control field can belong to the second part of the frame in order to verify the integrity of the additional data transmitted. The second control field can also be calculated over the entire frame rather than only over the second part.

The frame according to the invention also comprises a relay bit fixed at a predetermined value and which commences the second part of the frame. This relay bit can inform the new generation receivers that additional information will follow, but in particular the relay bit can inform the old receivers that the information which follows does not concern them and that they should treat it as noise. This information is in particular necessary when a Manchester-type code is used to determine the state of a bit. The conventional RTS protocol uses a Manchester code and systematically controls the end of the frame.

In a Manchester-type code, the state of the data bit is provided by a rising or falling edge in the middle of the transmission time of this bit. In the context of a conventional RTS frame, a rising edge represents a logic bit 1 and a falling edge represents a logic bit 0. In order to validate a read bit, three factors are taken into account: the count of the read bits, the direction of the edge (rising or falling) and the interval of time delta t between two edges (conventionally 1280 μs, corresponding to the transmission time of a bit). In order to verify the end of a frame, the conventional RTS protocol verifies the presence of a falling edge in a given interval of time equal to half the transmission time of a bit, i.e. delta t/2 (640 μs). If the last bit of the frame is at 0, the falling edge corresponding to the 0 validates the last bit. However, if the last bit of the frame is at 1, the obtaining of a falling edge will depend on the signal which follows the end of transmission of the conventional frame.

If the noise is such that it prolongs in a substantially stable manner the high state of the signal, without a falling edge beyond the clock signal or such that it corresponds for example to a bit of value 0, the next falling edge will only be obtained after an interval greater than delta t/2 (640 μs). The frame will then be refused. This random phenomenon is rare and possibly compensated for by the cyclic sequence of repetition of the frames. However, if the additional information is added at the end of a conventional RTS frame, the probability of having a logic code at 0 on the first bit of additional information is 50%. This would produce a refusal of the conventional RTS frames by the old receivers too frequently to be acceptable. The first bit of additional information must therefore be set at 1 in order for the old receivers to validate all of the RTS base frame constituting the first part of data of the new frame, no matter what the value of the $56^{th}$ bit ending the RTS base frame.

By adding a certain number of bits at the end of the first part of the frame, a first bit of additional information is thus kept in the second part of the frame, called a relay bit, which will be systematically set at 1. Thus, by forcing a rising edge on the bit immediately following the last bit of the RTS base frame, it is guaranteed that a falling edge (at the time of the clock signal) occurs in an interval of delta t/2 (640 ms). The old receivers, having received a sufficient and comprehensible number of bits, do not react to the new transmitted information which they interpret as noise. If this first bit of additional information is not forced to 1, the additional data of the second part of the frame could start with a zero and endanger the acceptance of the first part of the frame by an old receiver. This arrangement is linked in this case to the choice of the criteria for validating the frame of the old protocol and also depends on the encoding used, in particular the choice of logic code for a rising or falling edge for a Manchester code.

The invention also relates to a telecommunications system comprising at least one old generation command transmitter, a new generation command transmitter, an old generation command receiver and a new generation command receiver.

Figure 5:
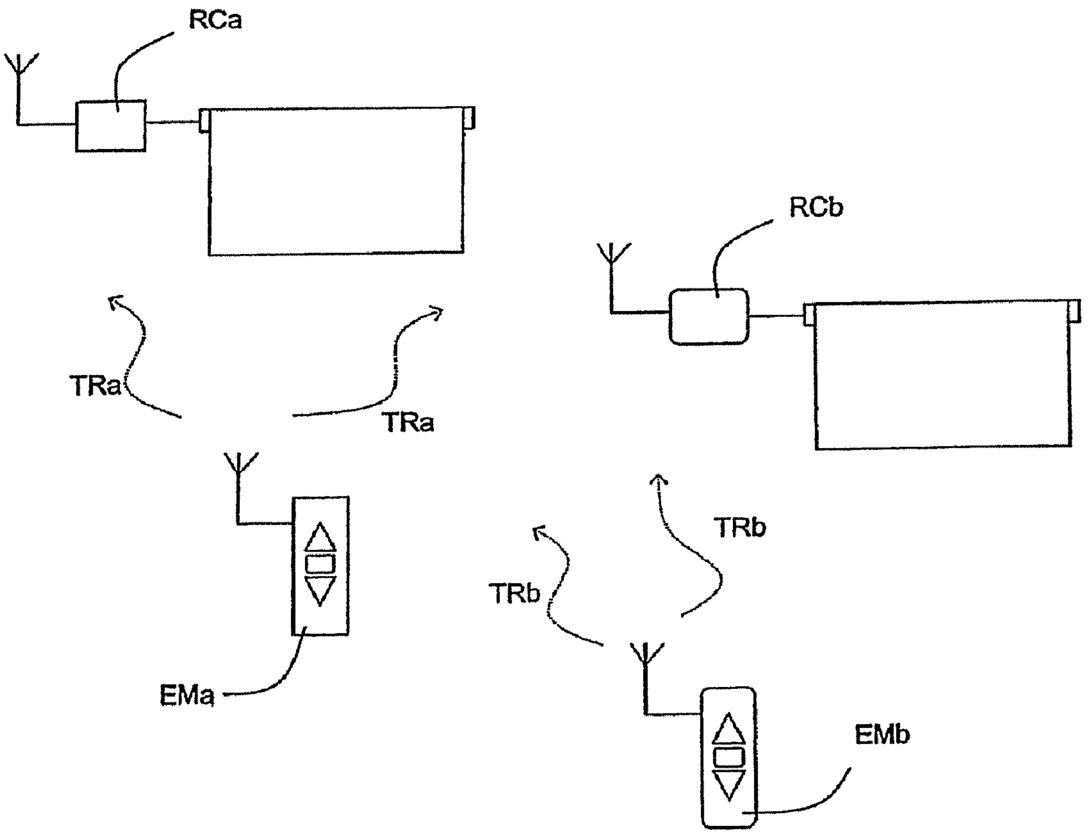
FIG. 5, a representation of a system with cross-compatibility according to the present invention.

FIG. 5 illustrates the system according to the invention.

The old generation transmitters EMa and receivers RCa are able to transmit and receive respectively and to interpret a cyclic control frame TRa according to a first protocol, for example a conventional RTS protocol. Moreover, the new generation transmitters EMb and receivers RCb are able to transmit and receive respectively and to interpret a cyclic control frame TRb according to a second protocol. The frame of the second protocol comprises a frame of the first protocol directly followed by complementary information, for example a new generation RTS frame as described previously.

The receivers RCa or RCb are linked to actuators, as represented in FIG. 5 for example, of the tubular geared motors used to drive window blinds. The receiver can be an integral part of the actuator, for example be contained in the housing of the tubular actuator, inside the winding tube of the blind.

According to the invention, an old generation RCa receiver is also able to receive and interpret a control frame TRb according to the new protocol and a new generation receiver RCb is also able to receive and interpret a control frame TRa according to the old protocol.

The old protocol frame has a fixed length, for example 56 bits, and the old protocol transmits frames separated by an inter-frame interval. The new protocol frame transmits complementary information during the inter-frame silences defined in the inter-frame intervals of the old protocol.

The additional data transmitted by the new protocol frames TRb thus appear as noise to the old receivers RCa while the data provided in the inter-frame interval can be processed by the new receivers RCb. Because the frame of the first protocol is also completely within the new protocol and the frame flow is not modified, the new frame can be read by the old types of receivers; thus the downward compatibility is ensured with a communication between new transmitters EMb and old receivers RCa. Similarly, the upward compatibility is ensured with a communication between old transmitters EMa and new receivers RCb; blanks (inter-frame silence) are received by the new receivers instead of the additional data, but the message can be read by the new receivers because the format of the base frame is identical for the two types of protocols.

The number of bytes transmitted in a new generation control frame TRb depends on the inter-frame silence available, but can be increased by an increase in the rate of transmission of this data. The new protocol frame can be transmitted at a first rate during the transmission of the base frame then at a second rate during the transmission of the additional information, the second rate being greater than the first. The message transmitted by the new generation transmitters could thus comprise a first part of transmission at a first rate corresponding to that of the old protocol followed by a second part of transmission of data at a greater rate so as to transmit a greater number of bytes.

This modification of transmission rate will be transparent to the old receivers which do not process the additional data. However, it may involve a modification of the data-processing electronics for the new generation transmitters and receivers, if the transmission rate chosen is greater than the maximum processing speed of the old generation transmitters and receivers.

The invention also relates to a command transmitter EMb for a telecommunications system according to the invention which is able to transmit control frames TRb according to the new protocol and a command receiver RCb for a telecommunications system according to the invention which is able to receive control frames TRb according to the new protocol.

In particular, the new generation receivers are able to interpret the content of the additional information transmitted after a base frame in the new frames. This additional information is interpreted in combination with the data of the base frame which is entirely contained in the frame of the new protocol.

This additional information can comprise additional identification or address information. The existing RTS protocol has a limited number of addresses, encoded in 24 bits, which can lead to a saturation. It is therefore possible, in the context of the new protocol, to use certain bytes of additional information to encode additional address information. This additional address information can represent an indication of a family, corresponding to a type of product, to a dealer using the protocol on his own products or otherwise, or simply correspond to additional random code data. If it is chosen to differentiate families of products operating on the new generation protocol according to the invention, functionalities for locking the receiver onto a particular family can be provided, according to the first code or codes received in the additional information and the second frame part.

The additional information can also allow tightening of the security of the transmission of a frame. New authentication functionalities can be added in the second part of the frame transmitted according to the new generation protocol. For example, the transmitter provides, in the second part of data of the frame, a random number at the same time as a result of a calculation based on a key which it shares with a receiver. Upon reception of the frame, the receiver repeats the calculation using the random number transmitted and verifies the result with that transmitted in the additional information of the frame. This authentication can take place in addition to the verification of the identifier of the transmitter with the data of the first part of the frame.

Of course, the present invention is not limited to the embodiments described by way of example. Any actuator control protocol using fixed length frames repeated cyclically can be used in the context of the invention in order to construct a new protocol consisting of adding, to the conventional base frame, additional information placed in the inter-frame silence defined by the conventional protocol.

Specific embodiments of a communication system with cross-compatibility and associated communication frame according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method of communication between a transmitter and a receiver comprising:

transmitting a control frame from the transmitter to the receiver, wherein the receiver is one of an old generation receiver or a new generation receiver, and wherein the control frame includes:

a first part comprising first data and a first control field;

a second part comprising second data and a second control field; and an additional information bit commencing the second part, said additional information bit being systematically set to a predetermined fixed value, wherein the additional information bit, having the predetermined fixed value, ensures acceptance of the first part of the control frame by the old generation receiver and informs the old generation receiver to treat the second data and the second control field as noise, and wherein the additional information bit, having the predetermined fixed value, informs the new generation receiver that additional information will follow the additional information bit.

2. The method of communication according to claim 1, wherein the second part of the control frame follows directly after the first part of the control frame.

3. The method of communication according to claim 1, wherein the first control field belongs to the first part of the control frame.

4. The method of communication according to claim 1, wherein the second control field belongs to the second part of the control frame.

5. The method of communication according to claim 1, wherein the second control field is global to the whole control frame.

6. The method of communication according to claim 1, wherein the additional information bit is fixed at '1'.

7. The method of communication according to claim 1, wherein the second data of the second part of the control frame are encrypted with a first encryption key transmitted in the first part of the control frame.

8. The method of communication according to claim 7, wherein the second data of the second part of the control frame are encrypted with a second encryption key transmitted in the second part of the control frame.

9. The transmitter which is able to transmit control frames according to claim 1 wherein the transmitter is a command transmitter for a telecommunications system.

10. The receiver which is able to receive control frames according to claim 1 wherein the receiver is a command receiver for a telecommunications system.

11. The receiver according to claim 10, wherein the receiver is able to interpret the content of the second part of the data.

12. The receiver according to claim 11, wherein the receiver interprets the content of the second part of data as a function of the content of the first part of data.

13. The receiver according to claim 10, wherein the receiver is able to interpret the content of the first part of data and to interpret the second part of data as noise.

14. The method of communication according to claim 1, further comprising:

transmitting the first part of the control frame at a first data rate; and transmitting the second part of the control frame at a second data rate, wherein the second data rate is greater than the first data rate.

15. A system for control of actuators which is able to transmit and receive control frames, wherein each control frame is according to claim 1, the system comprising:

an old generation command transmitter which is able to transmit a control frame in a cyclic manner according to a first protocol;

a new generation command transmitter which is able to transmit a control frame in a cyclic manner according to a second protocol, said frame of the second protocol comprising a first part constituted by a frame of the first protocol directly followed by a second part comprising additional information;

an old generation command receiver linked to an actuator and able to receive and interpret a control frame according to the first and second protocols; and a new generation command receiver linked to an actuator and able to receive and interpret a control frame according to the first and second protocols.

16. The system according to claim 15, wherein the control frame of the second protocol is the control frame according to claim 1.

17. The system according to claim 15, wherein the frame of the first protocol has a fixed length.

18. The system according to claim 15, wherein the first protocol transmits frames separated by inter-frame silences and in that the additional information of the frames of the second protocol are transmitted during the inter-frame silences of the first protocol.

19. The system according to claim 15, wherein the additional information of the frames of the second protocol is only interpreted by the new generation command receivers, the old generation command receivers interpreting only the frame of the first protocol contained in the frame of the second protocol.

20. The system according to claim 15, wherein a frame of the second protocol is transmitted at a first data rate when the frame of the first protocol is transmitted and at a second data rate when the additional information is transmitted, the second data rate being greater than the first.

21. The system according to claim 15, wherein the additional information of a frame of the second protocol is interpreted in combination with the data of the frame of the first protocol contained in the frame of the second protocol.

22. The system according to claim 15, wherein the cycles of transmission of the control frames of the first protocol and of the second protocol are identical.

23. The system according to claim 15, wherein at least one portion of the frame of the second protocol is encrypted.

24. The system according to claim 23, wherein the encrypted portion is the frame of the first protocol contained in the frame of the second protocol.

* * * * *